(12) United States Patent
Paloumbis et al.

(10) Patent No.: US 11,342,573 B2
(45) Date of Patent: May 24, 2022

(54) ION-IMBIBED MEMBRANES BASED ON PROTON CONDUCTING AROMATIC POLYETHER TYPE COPOLYMERS AND THEIR APPLICATION IN REDOX FLOW BATTERIES

(71) Applicant: Advent Technologies Inc., Cambridge, MA (US)

(72) Inventors: George Paloumbis, Patras (GR); Christos L. Chochos, Athens (GR); Emory Sayre De Castro, Nahant, MA (US); Nora Gourdoupi, Patras (GR); Ryan Pavlicek, Roslindale, MA (US); Manav Sharma, Medford, MA (US); Vasilis G. Gregoriou, Drosia Attica (GR)

(73) Assignee: ADVENT TECHNOLOGIES INC., Boston, MA (US)

( * ) Notice: Subject to any disclaimer, the term of this patent is extended or adjusted under 35 U.S.C. 154(b) by 96 days.

(21) Appl. No.: 16/806,002

(22) Filed: Mar. 2, 2020

(65) Prior Publication Data
US 2020/0411892 A1    Dec. 31, 2020

Related U.S. Application Data

(60) Provisional application No. 62/791,115, filed on Jan. 11, 2019.

(51) Int. Cl.
*H01M 8/18* (2006.01)
*H01M 8/1032* (2016.01)
*H01M 8/1027* (2016.01)

(52) U.S. Cl.
CPC ......... *H01M 8/188* (2013.01); *H01M 8/1027* (2013.01); *H01M 8/1032* (2013.01)

(58) Field of Classification Search
CPC ... H01M 8/188; H01M 8/1032; H01M 8/1027
See application file for complete search history.

(56) References Cited

U.S. PATENT DOCUMENTS

| | | | |
|---|---|---|---|
| 7,786,244 B2 | 8/2010 | Geormez | |
| 7,842,733 B2 | 11/2010 | Gourdoupi | |
| 7,842,734 B2 | 11/2010 | Geormezi | |
| 9,276,282 B2 | 3/2016 | Zhang | |
| 2006/0178411 A1* | 8/2006 | Teasley | H01M 8/103 514/364 |

(Continued)

OTHER PUBLICATIONS

Membrane stability studies far vanadium redox cell applications, Feb. 2004, Journal of Applied Electrochemistry 34(2):137-145.

*Primary Examiner* — Stewart A Fraser
(74) *Attorney, Agent, or Firm* — Davis Malm D'Agostine PC; David J. Powsner

(57) ABSTRACT

The present invention relates to a class of polymer ion imbibed membranes for electrolyte flow batteries. The membranes are a conducting aromatic polyether type copolymer bearing nitrogen heterocycles groups, especially pyridine type. While the membranes can be used in acid, basic, and neutral electrolytes, the nitrogen heterocycles in the membrane interact with acid in the electrolyte to form a proton transport network, so as to keep the proton transport performance of the membrane. The membrane has excellent mechanical stability and thermostability as well as tunable porosity.

27 Claims, 2 Drawing Sheets

(56) References Cited

U.S. PATENT DOCUMENTS

| | | | |
|---|---|---|---|
| 2008/0248364 A1* | 10/2008 | Gourdoupi | H01M 8/1072 |
| | | | 429/494 |
| 2010/0047660 A1* | 2/2010 | Geormezi | C08G 75/23 |
| | | | 429/494 |
| 2012/0202129 A1 | 8/2012 | Andreopoulou | |
| 2016/0276695 A1* | 9/2016 | Esswein | C07F 7/28 |

* cited by examiner

ION-IMBIBED MEMBRANES BASED ON PROTON CONDUCTING AROMATIC POLYETHER TYPE COPOLYMERS AND THEIR APPLICATION IN REDOX FLOW BATTERIES

CROSS-REFERENCE TO RELATED APPLICATIONS

This application claims the benefit of U.S. Provisional Application No. 62/791,115, filed Jan. 11, 2019.

STATEMENT REGARDING FEDERALLY SPONSORED RESEARCH OR DEVELOPMENT

This invention was made with government support under Contract No. DE-AR0000767 awarded by U.S. Department of Energy/ARPA-E. The government has certain rights in the invention.

FIELD OF INVENTION

The invention relates to membranes for use in electrolyte flow batteries. More specifically, the invention relates to a class of aromatic polyether type copolymer ion imbibed membranes, their composite membranes and their applications to a wide assortment of redox flow battery chemistries, and in particular acidic electrolyte vanadium redox flow batteries.

DESCRIPTION OF THE RELATED ART

Flow batteries with charge-accumulating electrolytes are a critical technology in the field of electrochemical energy storage. Redox flow batteries (RFB) containing either different or same compounds in different redox states are considered a critical bridge to widespread adoption of renewable energies such as wind and solar, as well as a critical tool in load leveling on the power grid. It is one of the preferred technologies for the large scale and high efficiency energy storage. The advantages of RFBs include high conversion efficiency, flexible system design, large storage capacity, flexibility in site selection, deep discharge, safe and environmentally friendly, and low maintenance cost. One established example is the vanadium redox flow battery (VRB), which has the advantages of high security, strong stability, high efficiency, long operating life (above 15 years) and low cost. Thus it has been considered as the most promising and representative among flow batteries. In addition, there are other viable chemistries such as lithium ion redox flow batteries, iron redox flow batteries, and organic molecule redox flow batteries. In each of these chemistries, the amount of energy such systems can store is determined by the tank size, maximum concentration of redox flow compound(s), and conversion/charge efficiency that is also a function of the degree of cross over by the redox molecule(s) through the membrane. The amount of power such systems can produce is a function of the electrochemical cell, electron transfer rates, and separator membrane resistance.

The separator membrane is a key component in a flow battery, and a vast majority of RFBs use ion exchange membranes. These membranes separate the positive and negative electrolytes while at the same time act as the conduit for transporting counter ions between the positive and the negative electrolyte. Therefore, separator membranes are required to have high ionic conductivity, ion selectivity with regards to minimizing cross over, and good chemical stability. Typically, separator membranes employ immobilized ion exchange groups such as sulfonic acid or quaternary amines in order to facilitate proton or hydroxide exchange while inhibiting cross over of redox species. Some commercial membranes (such as Selemion CMV, CMS, AMV, DMV, ASS and DSV from AGC Engineering Co Ltd) are not stable enough in acid vanadium solution (*J. Appl Electrochem*, 2004,34(2):137) however, perfluorosulfonic acid (PFSA) polymers typically meet the stability requirement. However, studies found that even though the commercial PFSA polymers such as Nafion® from Chemours, Del., USA possess high mechanical strength and chemical stability, the permeation rate (i.e., cross over) of vanadium ions when used in VRFB is high. There is also water migration between the anode and cathode during charge-discharge cycles. Moreover, the complex production technology for introducing fluorine and sulfonic acid exchange groups into the PFSA combined with severe synthetic conditions and associated high safety costs in making PFSA membranes has led to cost constraints that ultimately limit the application of this class of membranes in RFBs.

An alternative approach to ion exchange membranes is ion or electrolyte imbibed membranes. For this class of membranes, a simple porous matrix is composed of inert polymers such as but not limited to polyethylene, polytetrafluoroethylene, and polypropylene. While this class of materials meets the cost constraints for commercial devices, they often lack either stability with strong oxidizing redox species; have low capacity to imbibe electrolytes due to the hydrophobic nature of the matrix, or have little flexibility in being able to control both conductivity and permeability at the same time.

A solution to the problem of employing simple porous matrix membranes lies in creating polymers whose structure and thus permeability can be readily changed through small changes in monomer structure, and whose capacity for imbibing electrolyte can be increased through ion facilitators. One class of materials well suited to this purpose are membranes with aromatic polymer membranes with facilitators composed of nitrogen heterocycles. These materials have excellent mechanical, thermal and chemical stability, and have received wide-spread attention in different fields ranging from fuel cells to electrolysis. For example, U.S. Pat. No. 9,276,282 teaches the use of imidazole-based heterocyclic polymers for a vanadium redox flow battery, and cites excellent stability. However, no teachings were disclosed as to how the conductivity can be advanced while maintaining low permeability of vanadium species across the membrane, nor how to tailor the polymer properties for other redox flow battery systems.

The present invention solves this and other limitations of the prior art as will become apparent upon reading and understanding the present specification.

SUMMARY OF THE INVENTION

The subject invention relates to a class of thermally stable aromatic copolymers comprising aromatic groups containing one or more nitrogen groups imbibed with acidic, basic or neutral electrolytes as separators for redox flow batteries. Preferably, said aromatic copolymers are aromatic polyethers bearing nitrogen heterocyclic groups. The invention further relates to electrochemical stacks incorporating the polymers of the present invention for use in redox flow batteries.

Additional features and benefits of the present invention will become apparent from the detailed description, figures, and claims set forth below.

DETAILED DESCRIPTION OF THE INVENTION

Figure 1:
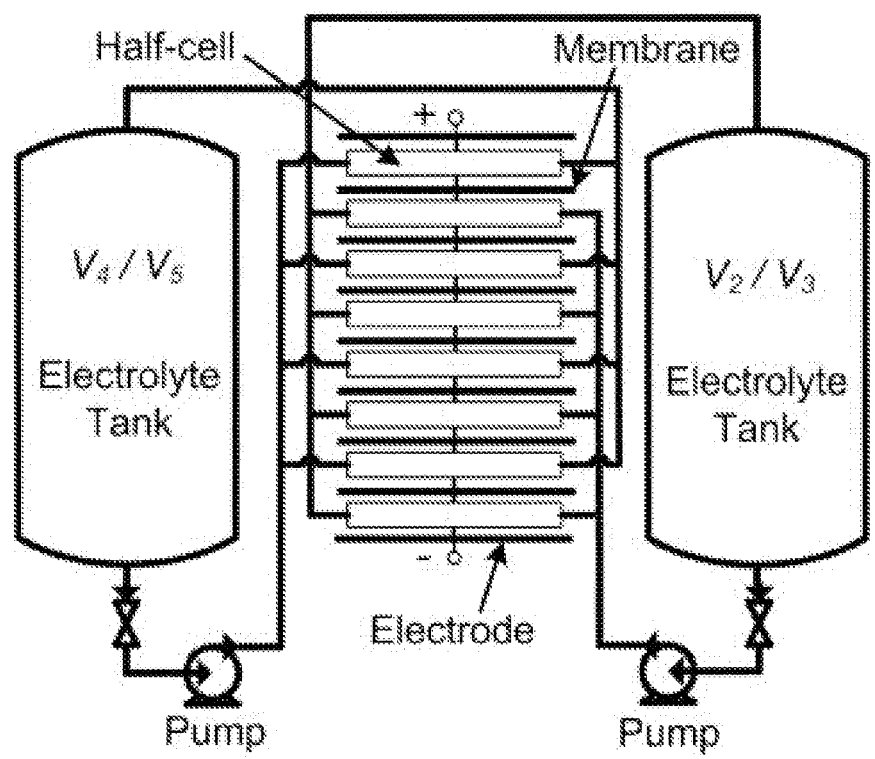
FIG. 1 is a schematic illustration of Vanadium Redox Flow Battery

The present invention relates to a class of aromatic polymer ion imbibed membranes and its composite membranes for redox flow battery applications. This type of polymer has aromatic nitrogen heterocycles that can interact with acids or bases and form a donor-acceptor mesh structure. In the case of acidic electrolytes the network structure can transport protons and maintain the ionic conductivity of the membrane while at the same time exclude the anolyte and catholyte redox species from cross over. These types of membrane materials have excellent thermal stability, chemical stability and good ionic conductivity. They can be used in many applications, and are particularly suitable for use as the ion imbibed membrane in the acidic, basic, or neutral electrolyte flow batteries.

The following non-limiting structures of the aromatic polyether type copolymers containing nitrogen heterocycles such as pyridine derivatives either in the main chain or side substituents, are illustrative of the invention. Other suitable aromatic copolymers comprising aromatic moieties (or groups) containing one or more nitrogen groups are described in U.S. Pat. Nos. 7,754,843, 7,842,733, 7,786,244, 7,842,734, 7,842,775 and U.S. patent application Ser. No. 13/367,855, incorporated herein by reference. The following are the structures of some of the preferred polymers:

Structure 1

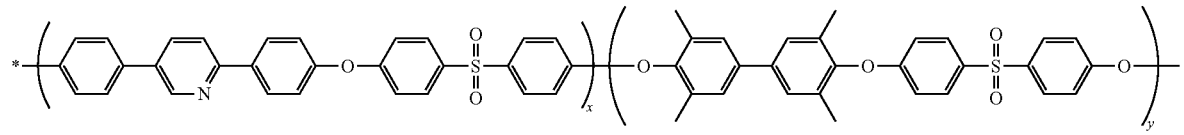

Structure 2

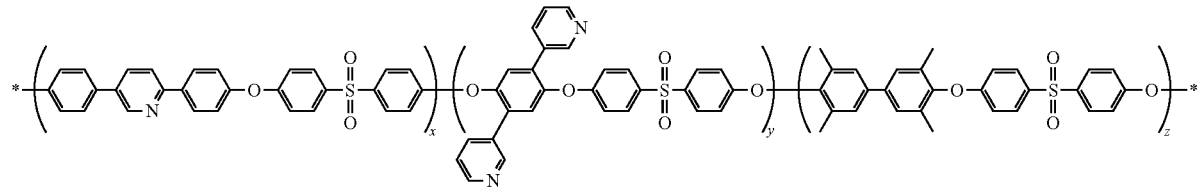

Structure 3

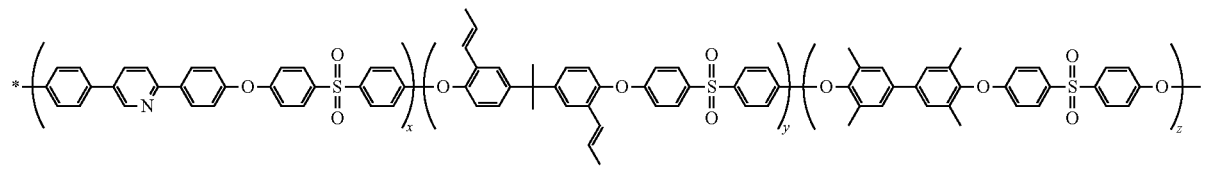

Structure 4

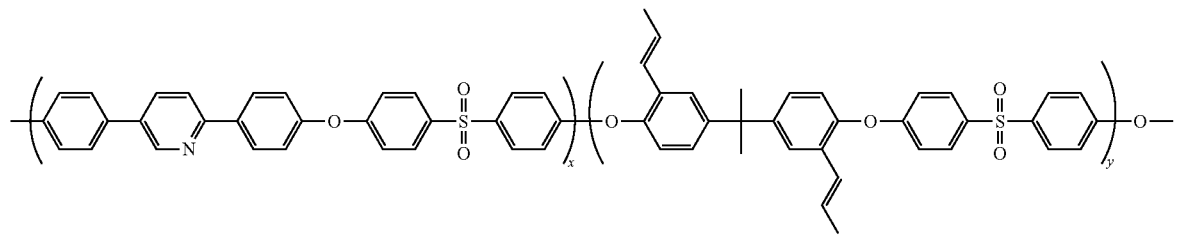

Structure 5

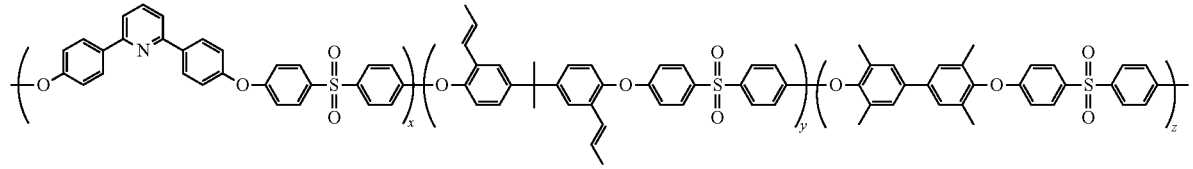

-continued

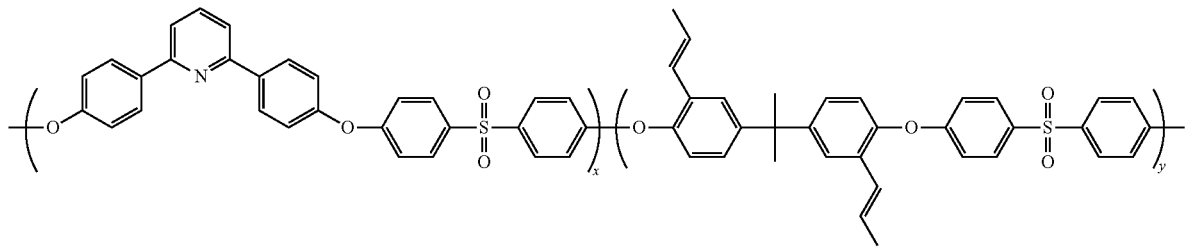

Structure 6

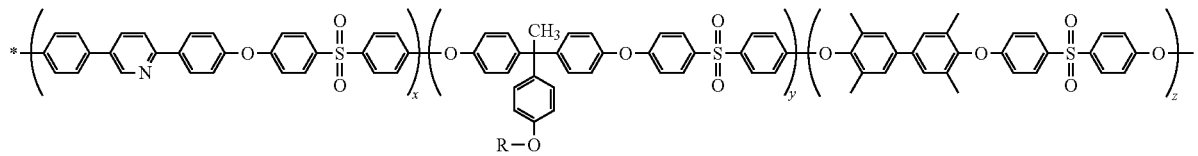

Structure 7

R = polymer chain and cross-linked variations of structures 1 to 7.

The ion imbibed membranes are obtained by using the above-described polymers through solution casting. Appropriate solvents such as dimethyl acetamide, cyclopentanone, dimethyl formamide, xylene, ortho-xylene, meta-xylene, para-xylene, chlorobenzene, dichlorobenzene, trichlorobenzene are selected for the various polymers according to their solubility. Membranes are formed by dissolving the polymer to form a polymer solution and then casting the solution directly on a glass plate or a continuous roll of inert polymer carrier, drying at a certain temperature, and thus forming an aromatic polymer membrane with thickness 0.1 to 1000 microns. The dry membrane is made into a conducting ion imbibed membrane by first immersing the aromatic polymer membrane in a strong electrolyte solution (acid, basic, or neutral with high ionic strength) with a concentration typically of 0.5 to 20 mol/L, soaking time 0.05-100 h, and the solution temperature at 5-200° C. After electrolyte doping, each repeating unit in the polymer comprises one or more electrolyte molecules.

The beneficial effects of the present invention include:

a) The present invention discloses using aromatic polymer membrane as the ion exchange membrane in the acidic electrolyte flow battery. In a preferred embodiment, the membrane uses acidic electrolyte as a conductive medium, and nitrogen heterocycles in the polymer form the structure of the receptor. It has very low water migration and very high ion selective permeability in the proton transfer process, which greatly reduces the uneven distribution of the positive and negative electrolyte and the self-discharge phenomenon (i.e., cross over), effectively extending the life of the electrolyte. The ion imbibed membrane material prepared according to this invention can be easily made into membranes.

b) The ion imbibed membrane prepared according to this invention has excellent thermal stability, being stable to temperatures up to at least 280° C., for example up to about 480° C., as well as mechanical stability and oxidation stability.

c) The membrane used in this invention has good structural stability, low cost, suitable for long and stable application in acidic electrolyte flow battery and large-scale commercial development.

d) The ion imbibed membrane prepared according to this invention has excellent ion conductivity.

e) The ion imbibed membrane prepared according to this invention has a good ion selectivity and can avoid cross-contamination between the positive and negative electrolyte in acid flow battery.

f) The ion imbibed membrane prepared according to this invention can be tuned for conductivity and selectivity through simple changes in chemical structures, as will be discussed in Example 2.

The present disclosure is to be considered as an exemplification of the invention, and is not intended to limit the invention to the specific embodiments illustrated by the figures or described in the examples below.

Example 1

General Synthetic Procedure of Polymer 1

To a degassed flask equipped with a Dean-Stark trap were added bis-(4-fluorphenyl) sulfone), 2,5-(4',4"dihydroxy biphenyl)pyridine, 3,3',5,5'-tetramethyl-[1,10-biphenyl]-4, 4'-diol, $K_2CO_3$, toluene (5 mL), and n-methyl-2-pyrrolidone (NMP; 15 mL). The mixture was degassed and filled with argon, stirred at 160° C. for 48 h, and then stirred at 180° C. for 6 h. The obtained viscous solution was diluted in NMP and precipitated in 5-fold excess mixture of 3/1 MeOH/$H_2O$, washed with $H_2O$ and hexane, and dried at 100° C. under vacuum.

The same procedure was followed to produce other copolymers, by varying the feed ratio of the three diols and/or using different aromatic diols with the ability to cross link (structures 2, 3, 4, 5 & 6) and hyperbranch (structure 7) per that shown in Table 1.

Example 2

Structure Variation and Effect on Conductivity and Permeability

Table 1 lists the polymers produced as per Example 1 and the percentage of aromatic diol A or B in combination with allyl diol C in the polymer compositions. These polymers were subsequently used to prepare membranes in order to determine their performance, as described in Example 3.

TABLE 1

Different combinations of the diol monomers A or B with diol C used and the resulting exemplary polymer membranes.

| Entry | (A) | (B) | (C) | Examples |
|---|---|---|---|---|
| 1 | 55-75% | — | >20% | 1 |
| 2 | — | 55-75% | >20% | 2 |
| 3 | 55-75% | — | 10%-20% | 3a, 3b |
| 4 | — | 55-75% | 10%-20% | 4a, 4b, 4c |
| 5 | 55-75% | — | <10% | 5 |
| 6 | — | 55-75% | <10% | 6 |
| 7 | 55-75% | — | — | 7a, 7b |

Polymers of structures 1-7 were synthesized according to the general synthetic procedure described in Example 1. By varying the stoichiometry of each monomer in the final polymer chain (structures 1-7), one can affect the conductivity and V ion permeability of the imbibed membranes in the Vanadium Redox flow battery system.

Figure 2:
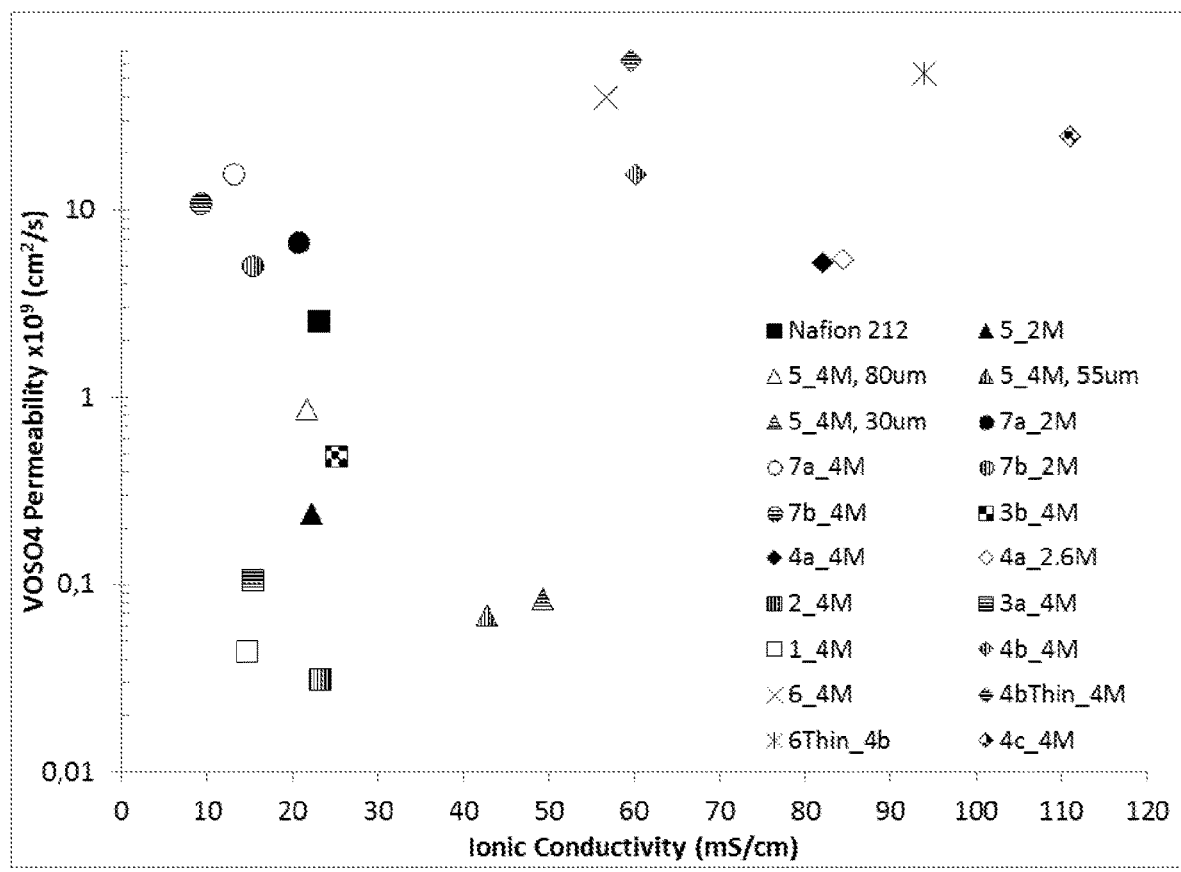
FIG. 2 illustrates $VOSO_4$ permeability and conductivity with various acid imbibed membranes.

In more detail, FIG. 2 (Example 3) shows that at high percentages of the cross linkable diol (C, Table 1, Entries 1 & 2) the permeability to V ions is at its minimum values independent of the linear (A, Table 1) or non-linear (B, Table 1) pyridine diol monomer. On the other hand, lower percentages of monomer C (<10%, entries 5 & 6) increase the conductivity of the membrane at the expense of higher permeability. Structures without monomer C have a tendency for both lower conductivity and higher permeability compared to the benchmark material. However, the optimum results for a vanadium system are obtained when the percentage of monomer C in the final polymer structure is in the range of 10-20% in combination with pyridine diol B (entry 4). More specifically, polymers/membranes 4a and 4c (FIG. 2, Example 3) show an enhanced conductivity profile and acceptable permeability compared to the benchmark membranes (Nafion 212).

Effects on conductivity, permeability and mechanical strength were also studied by using thinner/thicker membranes but the results remain to be investigated further.

Example 3

A "Side-By-Side" permeation cell (permegear.com/sbs.htm) was used for membrane permeability measurements (W. Xie et al., Polymer 52 (2011) 2032). The donor and receptor compartments (45 mL each, 25° C.) were separated by the membrane in question. The donor compartment was composed of 1.5 M $VOSO_4$ and 2.6 M $H_2SO_4$, while the receptor compartment contained 1.5 M $MgSO_4$ and 2.6 M $H_2SO_4$. Permeability was measured by evaluating the $VO^{2+}$ concentration in the receptor compartment as a function of time. This was done via UV-VIS spectroscopy. A calibration curve (X mM $VOSO_4$+2.6 M $H_2SO_4$) and blank solution (2.6 M $H_2SO_4$) were used as comparison points. The characteristic absorption of $VO^{2+}$ was observed at 248 nm. Once the $VO^{2+}$ concentration was characterized as a function of time, the salt permeability of the membrane could be calculated using the following equation:

$$\ln\left[1 - 2\frac{c_R(t)}{c_D(0)}\right]\left[-\frac{Vl}{2A}\right] = P_S t$$

where $c_R(t)$ and $c_D(0)$ are the receptor $VOSO_4$ concentration at time t and the initial donor $VOSO_4$ concentration, respectively, V is the donor and receptor solution volume, l is the membrane thickness, A is the active membrane area, and $P_S$ is the salt permeability. The left side of the above equation is then plotted as a function of time t, and a linear regression is carried out using the equation y=ax+b where a corresponds to the membrane permeability.

Conductivity measurements were conducted using a BekkTech 4-point probe conductivity cell, measuring the in-plane resistance. Four probes were placed against a single side of the membrane. A potential was applied between the two inner probes (separated by a known distance), while the current was measured across the two outer probes. Given a specific membrane area, membrane thickness, and separation between the two potential probes, the in-plane resistance of the membrane can be calculated through the equation shown below:

$$\sigma = \frac{L}{R \cdot W \cdot T}$$

where σ is the proton conductivity, R is the membrane resistance, L is the distance between the potential probes, and W and T are the membrane width and thickness, respectively. FIG. 2 shows the conductivity and permeability values for various pyridine derived membranes. The illustrative example of FIG. 2 demonstrates that simple changes in the polymer structure enables a change in permeability of 100 fold, and an enhancement in conductivity of over 5-fold without loss in permeability. While this example is for the vanadium system, the same materials are applicable to other inorganic redox flow systems such as the iron system, and organic redox flow batteries such as those based on quinones or modified quinones.

The invention has been described in an illustrative manner, and it is to be understood that the terminology which has been used is intended to be in the nature of words of description rather than of limitation. Many modifications and variations of the present invention are possible in light of the above teachings.

What is claimed is:

1. A proton-conducting copolymer for use in redox flow batteries, the copolymer comprising
heterocycle aromatic moieties containing one or more nitrogen groups,
wherein said copolymer is imbibed with an electrolyte,
wherein percentages of an aromatic diol in combination with an allyl diol in composition of the copolymer are 50%-75% of the aromatic diol and not more than 20% of an allyl diol, and
wherein the aromatic diol is a non-linear pyridine diol.

2. The copolymer according to claim 1, wherein said electrolyte is an inorganic acid.

3. The copolymer according to claim 1, wherein said electrolyte is an inorganic base.

4. The copolymer according to claim 1, wherein said copolymer is an aromatic polyether polymer.

5. The copolymer according to claim 1, wherein said copolymer is thermally stable in temperatures up to at least 280° C.

6. The copolymer according to claim 1, wherein a range of proton conductivity of the copolymer is 0.001 S/m to 1000 S/m.

7. The copolymer according to claim 1, wherein a porosity of the copolymer as measured by ion permeability is from $0.01 \times 10^9$ cm$^2$/sec to $100 \times 10^9$ cm$^2$/sec.

8. An ion-imbibed membrane comprising: the copolymer of claim 1 having as the electrolyte an inorganic acid.

9. The ion-imbibed membrane of claim 8, wherein the inorganic acid is selected from a group consisting of phosphoric acid, sulfuric acid, hydrochloric acid and nitric acid.

10. An acidic electrolyte flow battery, comprising the ion-imbibed membrane of claim 9.

11. The acidic electrolyte flow battery of claim 10, wherein the ion-imbibed membrane has a thickness of 0.1 to 1000 μm, and an acid concentration range of between 0.1 mol/L-25 mol/L.

12. An ion-imbibed membrane comprising: the copolymer of claim 1 imbibed with an inorganic base.

13. The ion-imbibed membrane of claim 12 where the inorganic base is selected from a group of hydroxides consisting of potassium, sodium, lithium, cesium, calcium, or strontium hydroxide.

14. A basic electrolyte flow battery, comprising: an ion-imbibed membrane of claim 13.

15. The basic electrolyte flow battery of claim 14, wherein the ion-imbibed membrane has a thickness of 0.1 to 1000 μm, and a base concentration range of between 0.1 mol/L-25 mol/L.

16. The copolymer of claim 1, wherein the non-linear pyridine diol has the formula

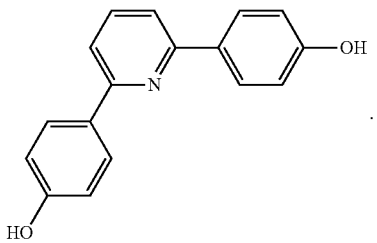 [SMILES: Oc1ccc(-c2cccc(-c3ccc(O)cc3)n2)cc1]

17. The copolymer of claim 16, wherein the allyl diol has the formula

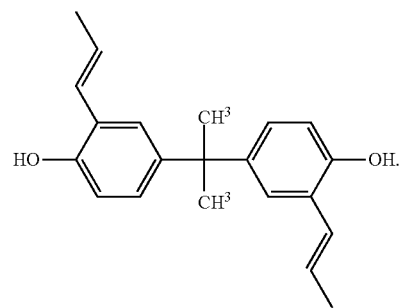 [SMILES: C/C=C/c1cc(C(C)(C)c2ccc(O)c(/C=C/C)c2)ccc1O]

18. A method of synthesizing a proton-conducting copolymer for use in redox flow batteries, the method comprising
combining a non-linear pyridine diol with an allyl diol to synthesize a copolymer,
wherein percentages of the non-linear pyridine diol and the allyl diol in composition of the copolymer are 50%-75% and not more than 20%, respectively, and
immersing the copolymer in an electrolyte to imbibe the copolymer therewith.

19. The method of claim 18, wherein the non-linear pyridine diol monomer has the formula

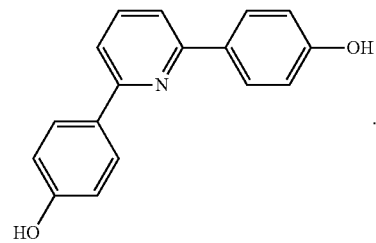 [SMILES: Oc1ccc(-c2cccc(-c3ccc(O)cc3)n2)cc1]

20. The method of claim 18, wherein the allyl diol has the formula

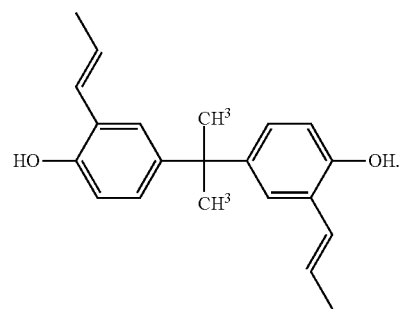 [SMILES: C/C=C/c1cc(C(C)(C)c2ccc(O)c(/C=C/C)c2)ccc1O]

21. The method of claim 18, wherein the non-linear pyridine diol monomer has the formula

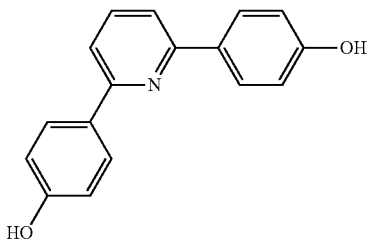 [SMILES: Oc1ccc(-c2cccc(-c3ccc(O)cc3)n2)cc1]

the allyl diol has the formula

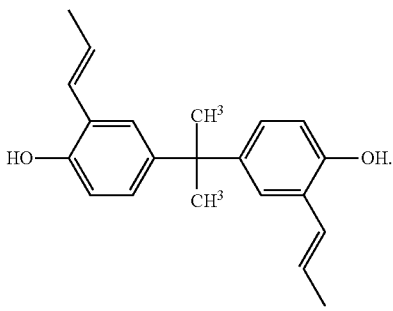 [SMILES: C/C=C/c1cc(C(C)(C)c2ccc(O)c(/C=C/C)c2)ccc1O]

22. A redox flow battery including a separator membrane comprising a proton-conducting copolymer synthesized according to the method of claim 21.

23. A method of synthesizing a proton-conducting copolymer for use in redox flow batteries, the method comprising
combining a non-linear pyridine diol with an allyl diol to synthesize a copolymer,
wherein percentages of the non-linear pyridine diol in combination with the allyl diol in composition of the copolymer are 50%-75% and less than 10%, respectively, and
wherein said copolymer is imbibed with an electrolyte.

24. The method of claim 23, wherein the non-linear pyridine diol monomer has the formula

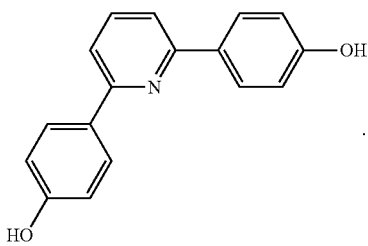 [SMILES: Oc1ccc(-c2cccc(-c3ccc(O)cc3)n2)cc1]

25. The method of claim 23, wherein the allyl diol has the formula

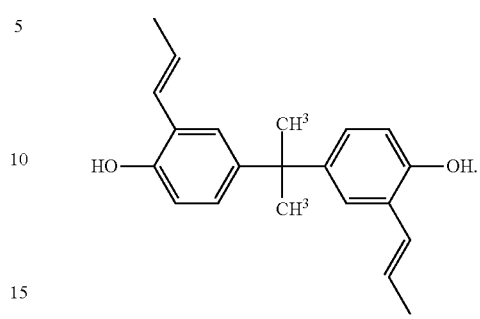

26. The method of claim 23, wherein the non-linear pyridine diol monomer has the formula

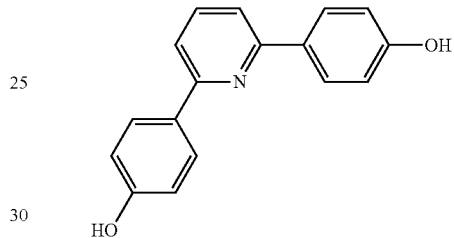

the allyl diol has the formula.

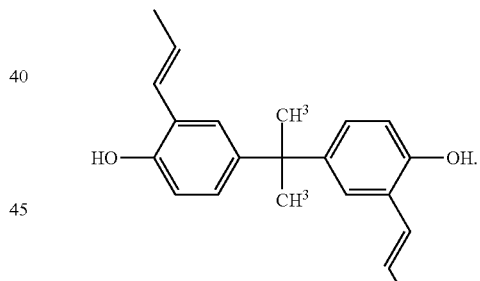

27. A redox flow battery including a separator membrane comprising a proton-conducting copolymer synthesized according to the method of claim 26.

* * * * *